UNITED STATES PATENT OFFICE.

HANS LEMON AND JAMES C. METCALFE, JR., OF MEMPHIS, TENNESSEE.

IMPROVEMENT IN COMPOUNDS FOR ARTIFICIAL STONE.

Specification forming part of Letters Patent No. 168,651, dated October 11, 1875; application filed August 26, 1875.

*To all whom it may concern:*

Be it known that we, HANS LEMON and JAMES C. METCALFE, Jr., of Memphis, Shelby county, Tennessee, have invented a new and useful Improved Artificial Stone, of which the following is a full, clear, and exact description.

The object of our invention is to produce a cheap and easily manufactured artificial stone, and one which can be used either for ornamental work in buildings, or for sidewalks, carriage-steps, &c.; and it consists in a combination of certain ingredients, as hereinafter specified.

In order that others skilled in the art may make and use our invention, we will proceed to describe the exact manner in which we have carried it out.

In the manufacture of our improved stone we use the following ingredients, mixed in the manner and order stated: Four parts of clear sand, two parts of cement, and one part of powdered burnt clay are thoroughly mixed in a dry state. Then add to every bushel of the above one quart of oxide of iron or iron filings, and mix thoroughly. Then mix these ingredients into a plastic state with a solution of one pound of sal-ammoniac dissolved in three gallons of water.

These above proportions may be varied without departing from the principle of our invention, but we prefer mixing them in about the proportions named. The plastic mass is then pressed into suitable molds, and left until hard or fit to remove from the molds. When the stone is removed from the molds it is left in a moist place or sprinkled with water until it becomes hard and fit to use.

The stone may be made of any color desired by adding to the plastic mass any color or combination of colors. Dry metallic colors are preferred.

Having thus described our invention, what we claim as new, and desire to secure by Letters Patent, is—

A compound for artificial stone made of clear sand, cement, and powdered burnt clay mixed with oxide of iron, the whole subsequently mixed with a solution of sal-ammoniac and water, substantially as above set forth.

HANS LEMON.
JAMES C. METCALFE, JR.

Witnesses:
JNO. C. FORBES,
J. B. PARRENT.